United States Patent Office 3,349,324
Patented Oct. 24, 1967

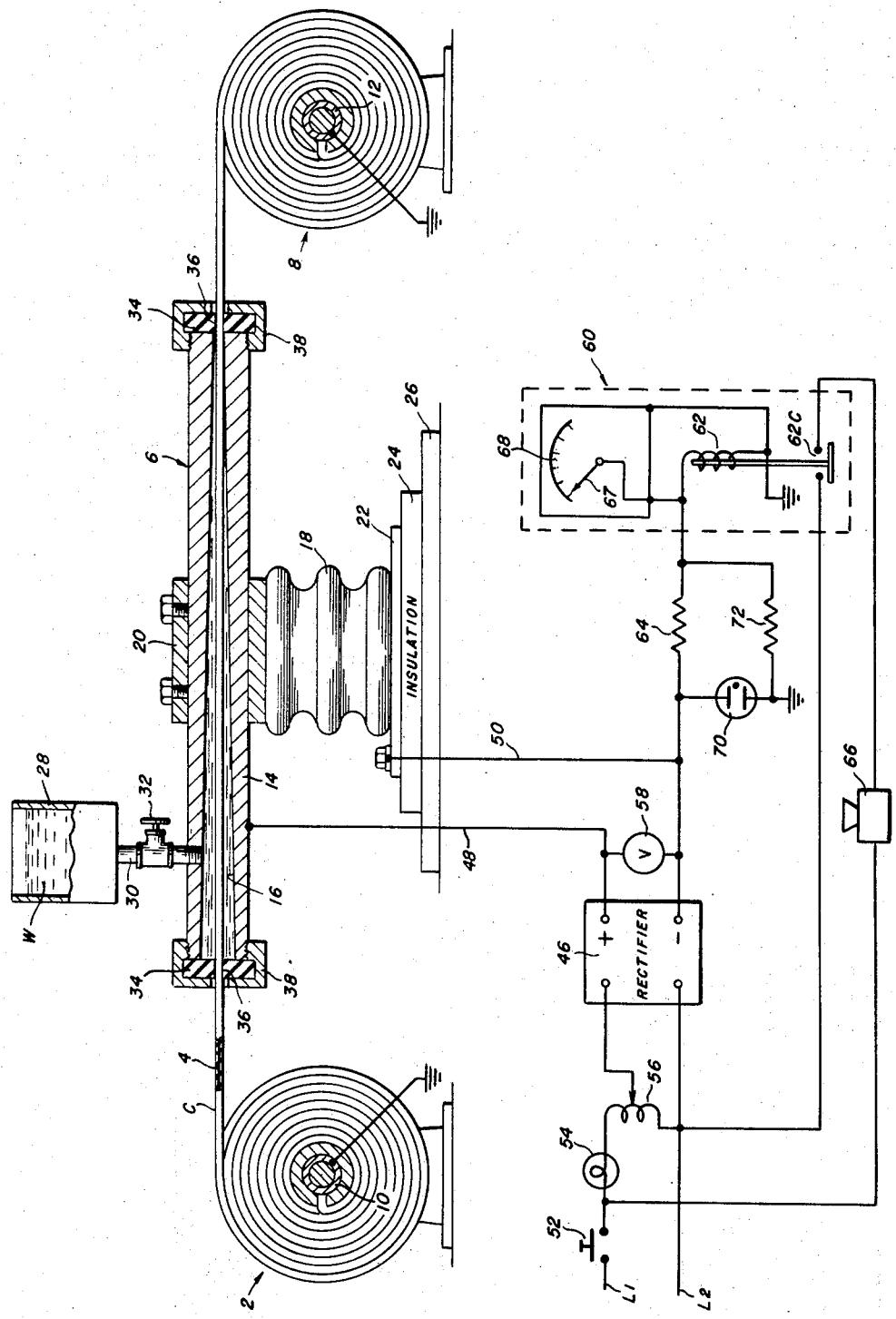

3,349,324
APPARATUS FOR LOCATING FAULTS IN INSULATED ELECTRIC CABLES INCLUDING ELONGATED TUBE MEANS HAVING A TAPERED BORE AND CONTAINING A CONDUCTING LIQUID ELECTRODE
Frederick W. Wakefield, Northboro, Mass., assignor to United States Steel Corporation, a corporation of Delaware
Filed Dec. 15, 1965, Ser. No. 513,988
7 Claims. (Cl. 324—54)

ABSTRACT OF THE DISCLOSURE

Apparatus for locating a fault in a moving insulated conductor including an elongated tube having a tapered bore decreasing in cross-sectional area from the entry to exit end and filled with a conducting liquid, and sealing means at each end of the bore with openings through which the insulated conductor passes, the conducting liquid serving as a direct current electrode.

This invention relates to apparatus for locating a fault in electric cables and more particularly to a high voltage testing electrode through which an electric cable having an outer insulating covering is passed. The electrode may be used with the apparatus shown in my prior Patent No. 3,134,071 dated May 19, 1964. Apparatus of this general type may require that the cable pass through water or other liquid or may not require such immersion as in my above mentioned patent. Each of these types of testers has advantages and disadvantages. In dry testing there is no assurance of complete contact between the cable insulation and the electrode. In most standard water tests, the cable is immersed in water for a prolonged time which may impair the electrical characteristics of the cable. Also, only the average value of the insulation resistance is measured.

It is therefore an object of my invention to provide a tester which has most of the advantages of the water immersion apparatus without its disadvantages.

This and other objects will be more apparent after referring to the following specification and attached drawings, in which:

The single figure is a schematic view of the apparatus of my invention.

Referring more particularly to the drawings, reference numeral 2 indicates a pay-off reel for supporting an electric cable C to be tested. The cable C consists of a conductor 4 surrounded by insulation. Cable C passes from the pay-off reel 2 through a high voltage electrode 6 to a take-up-reel 8 which is provided with the usual drive mechanism, not shown, for pulling the cable from reel 2 to the electrode 6. The end of conductor 4 on reel 2 is connected to slip ring 10, which in turn is connected to ground. The other end of conductor 4 is connected to a similar slip ring 12 on reel 8. The slip ring 12 is also connected to ground. While it is preferred to have both ends of conductor 4 grounded the cable may be tested with only one end grounded.

The electrode 6 of my invention includes a tube 14 of electrical conducting material having a tapered bore 16 with the large end of the bore being adjacent the reel 2 and the small end of the bore 16 being at the exit end of the tube and having a diameter only slightly greater than that of cable C. The cross section may be round, square or other shape as long as the cable C is surrounded by the liquid therein. The tube 14 is connected to a high voltage insulator 18 by means of a clamp 20. The lower end of the insulator 18 is fastened to an electrical conductive plate 22. Insulator 24, fastened to a mounting base 26, insulates the plate 22 from ground. A reservoir 28 containing water W is located above and is connected to the tube 14 by means of conduit 30 having a valve 32 therein. Each end of the tube 14 is closed by means of a flexible sealing gasket 34 having a hole 36 therethrough which closely surrounds the cable C. A cap 38, threaded on each end of pipe 14, holds the gaskets 34 in position.

A high voltage rectifier 46 has its positive terminal connected by means of lead 48 to the electrode 6 and its negative terminal connected to plate 22 by means of lead 50. If the electrode 6 is not made of electrical conducting material the lead 48 can be connected to the water W by making the reservoir 28 or conduit 30 conductive and connecting lead 48 thereto. A 115 volt A.C. power source L1, L2 is connected through a switch 52, lamp 54 and a continuously adjustable auto-transformer 56 to the rectifier 46. Closing of the switch 52 energizes the rectifier 46 with the light 54 limiting the current output of the rectifier to a safe value. A voltmeter 58 indicates the output voltage of rectifier 46. A meter relay 60 of any standard type includes a relay coil 62 having one side connected through resistance 64 to lead 50 and the other side grounded. Relay coil 62 has a normally open contact 62C which is connected in series with a horn 66 to power source L1, L2. The meter relay 60 also includes indicator pointer 67 and scale 68. The meter relay is a well known device that includes an ammeter for indicating the flow of current and also means for opening or closing contacts at a predetermined setting of its indicator pointer. A neon lamp 70 and resistance 72 are connected in series across resistance 64 to ground. If desired, the resistor 72 may be changed to change the range of the equipment. The electrical circuit shown and described is the same as that of my above identified patent. While it is preferred to use this circuit, other circuits may be used.

In operation, with the valve 32 open, switch 52 closed, and cable passing from reel 2 to reel 8, leakage current from electrode 6 will pass across the insulator 18 to the metal plate 22 and back to the negative terminal of the rectifier 46. Leakage current will also pass through the cable insulation enclosed by the electrode 6, through resistor 64 and coil 62 to ground. The leakage current flowing through the insulation is indicated on the indicator 68 by pointer 67. Knowing the voltage on electrode 6, which is indicated by the voltmeter 58, it is possible to determine the insulation resistance of the cable C within the electrode 6. At the same time there is a continuous voltage test on the insulation, the voltage being indicated by voltmeter 58. By changing the setting of transformer 56, the voltage impressed on the cable C can be varied as desired. When an insulation fault passes through the electrode 6 the current through the coil 62 will be sufficient to close contact 62C and sound the horn 66, thus indicating and locating the insulation fault. The complete circuit from rectifier 46 includes lead 50, resistor 64, meter relay 60 to ground, and lead 48, tube 14, water W, the cable fault, and the cable conductor to ground.

The positive water pressure inside the tube 14 provides intimate contact between the water and the electric cable insulation surface for a definite distance so that it is possible to measure the leakage current of the portion of the electric cable enclosed by the water forming the electrode. The water cools the insulation fault and prevents burning which would damage a small cable conductor. With less burning it is easier to determine the cause of insulation failure. I have also found that there is no sparking or corona within the electrode. The water pressure against the cable increases as the cable speed increases and, because of this increased water pressure on the insulation, cracks in the insulation wall can be detected without prolonged water immersion. The water pressure inside the tube 14 may also be varied by changing the amount of taper of the opening 16 and/or by changing the length of the tube 14. The water reservoir 28 maintains a positive water pressure inside the tube 14 at all times. If desired, the electrical conductivity of the water may be varied by means of a compatible chemical additive such as sodium chloride. The penetrating characteristics of the water may be varied by means of a chemical additive such as isopropyl naphthalene sodium sulfonate sold under the trade name Aerosol OS by American Cyanamid Company.

While one embodiment of my invention has been shown and described, it will be apparent that other adaptations and modifications may be made without departing from the scope of the following claims.

I claim:

1. Apparatus for use in testing a moving insulated conductor with direct current which comprises an elongated tube having a tapered bore through which said insulated conductor passes, said bore decreasing in cross sectional area from the entry to exit end thereof, a conducting liquid filling said bore, said conducting liquid within said bore serving as a direct current electrode circuit means connected to said liquid for detecting faults in the conductor, and means for sealing each end of said bore, each of said sealing means having an opening for said insulated conductor said sealing means closely surrounding the insulated conductor at said openings upon passage of said conductor therethrough.

2. Apparatus according to claim 1 including means for maintaining pressure on said conducting liquid in said bore.

3. Apparatus according to claim 1 in which said circuit means includes means providing D.C. power, said means having two terminals, a conductive member spaced from said tube, an insulator supported on said conductive member, said insulator supporting said tube, means insulating said conductive member from ground, means connecting one of said terminals to said conducting liquid, a lead connecting the other of said terminals to said conductive member, current responsive means having one terminal connected to said lead, means for grounding said conductor, and means connecting the other terminal of said current responsive means to ground.

4. Apparatus according to claim 3 including pay-off reel for supporting a length of insulated conductor to be tested, and a take-up reel spaced from said pay-off reel for pulling said insulated conductor from said payoff reel through said liquid.

5. Apparatus according to claim 3 including means for maintaining pressure on said conducting liquid in said bore.

6. Apparatus according to claim 5 including a pay-off reel for supporting a length of insulated conductor to be tested, and a take-up reel spaced from said pay-off reel for pulling said insulated conductor from said pay-off reel through said liquid.

7. Apparatus according to claim 1 in which said circuit means includes means providing D.C. power, said means having two terminals, a conductive member spaced from and insulated from said conducting liquid in said bore, means connecting one of said terminals to said conducting liquid, and a lead connecting the other of said terminals to said conductive member.

References Cited

UNITED STATES PATENTS

| 2,794,170 | 5/1957 | Gooding | 324—54 |
| 2,882,492 | 4/1959 | Gooding | 324—54 |
| 2,900,597 | 8/1959 | Gooding | 324—54 |
| 3,277,365 | 10/1966 | Doran | 324—54 |

FOREIGN PATENTS 914,121   12/1962   Great Britain.

RUDOLPH V. ROLINEC, *Primary Examiner.*

WALTER L. CARLSON, *Examiner.*

G. R. STRECKER, *Assistant Examiner.*